June 3, 1969  R. L. KONKLE  3,447,319
HYDROPNEUMATIC SYSTEM
Filed June 10, 1966
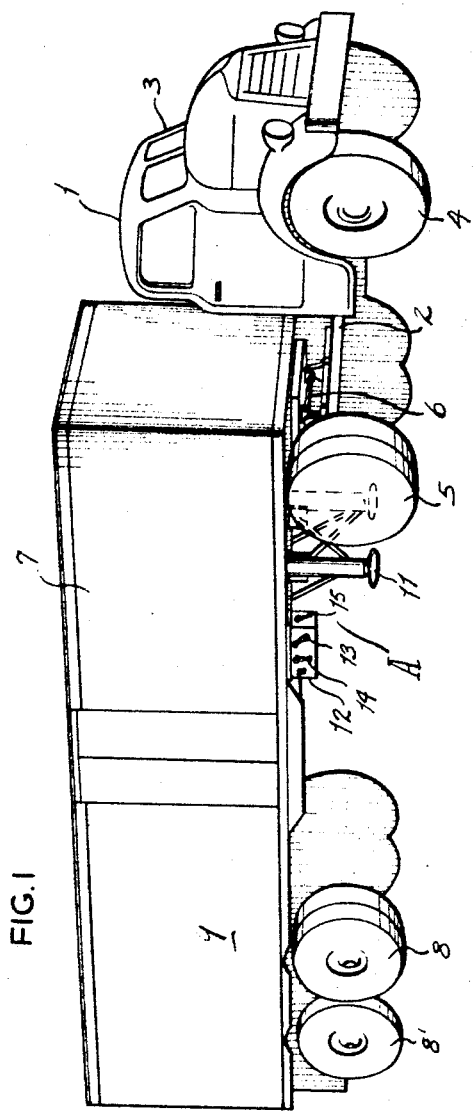
FIG.I
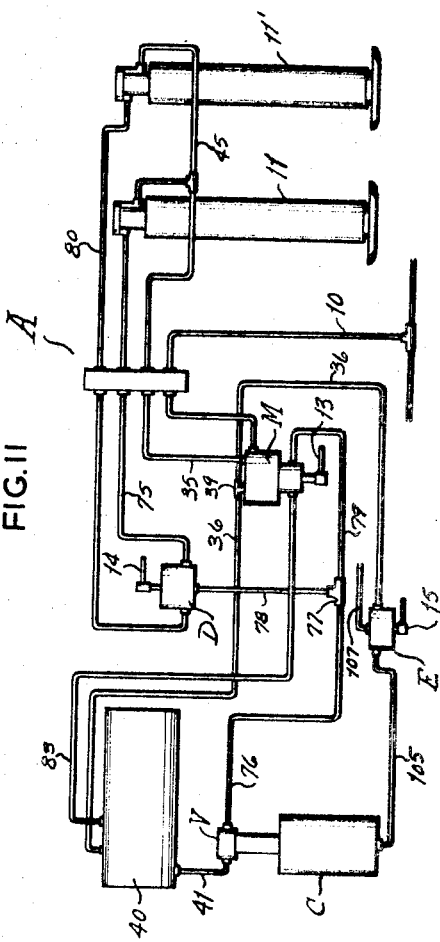
FIG.II
INVENTOR
RAYMOND L. KONKLE
BY
ATTORNEY

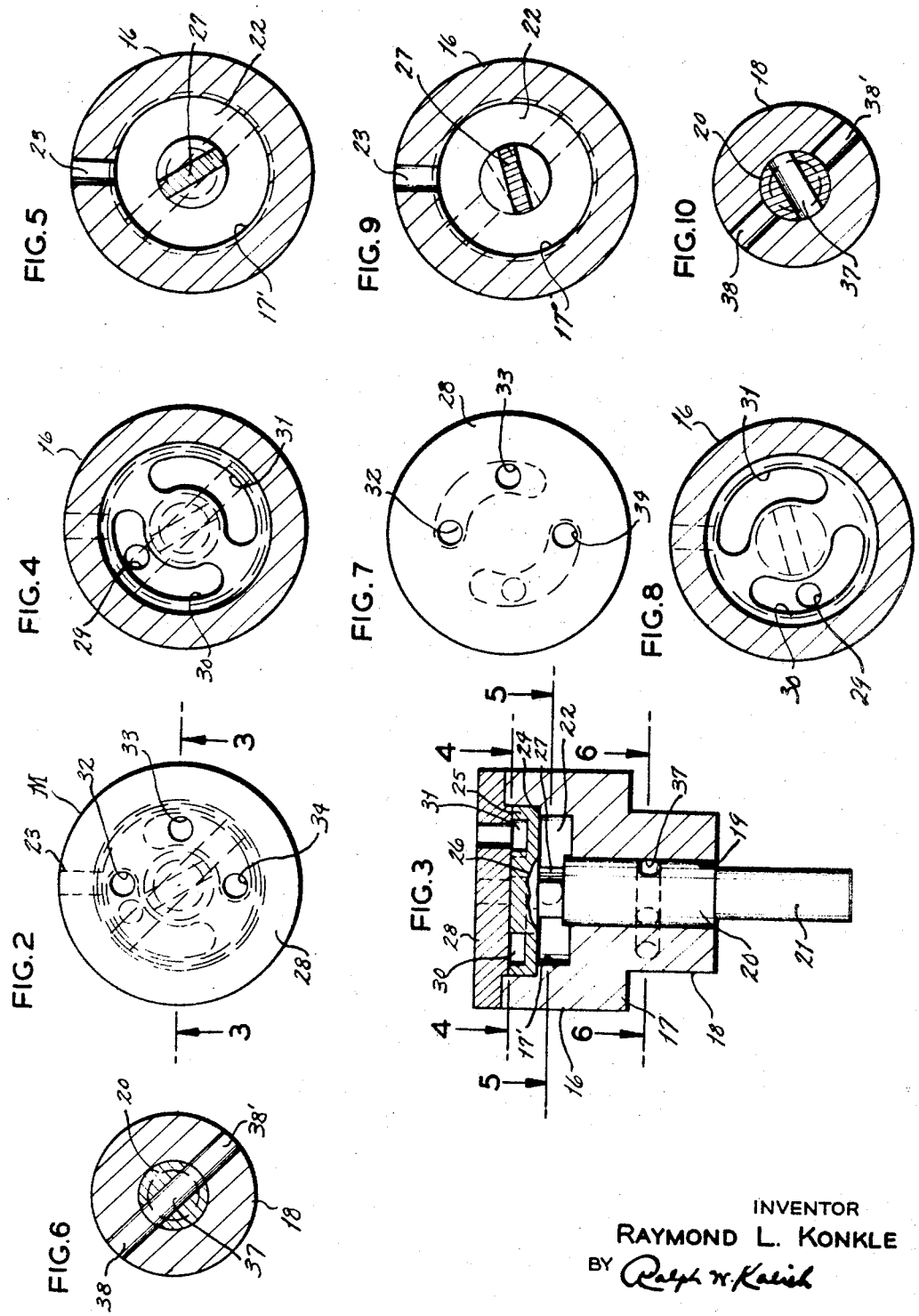

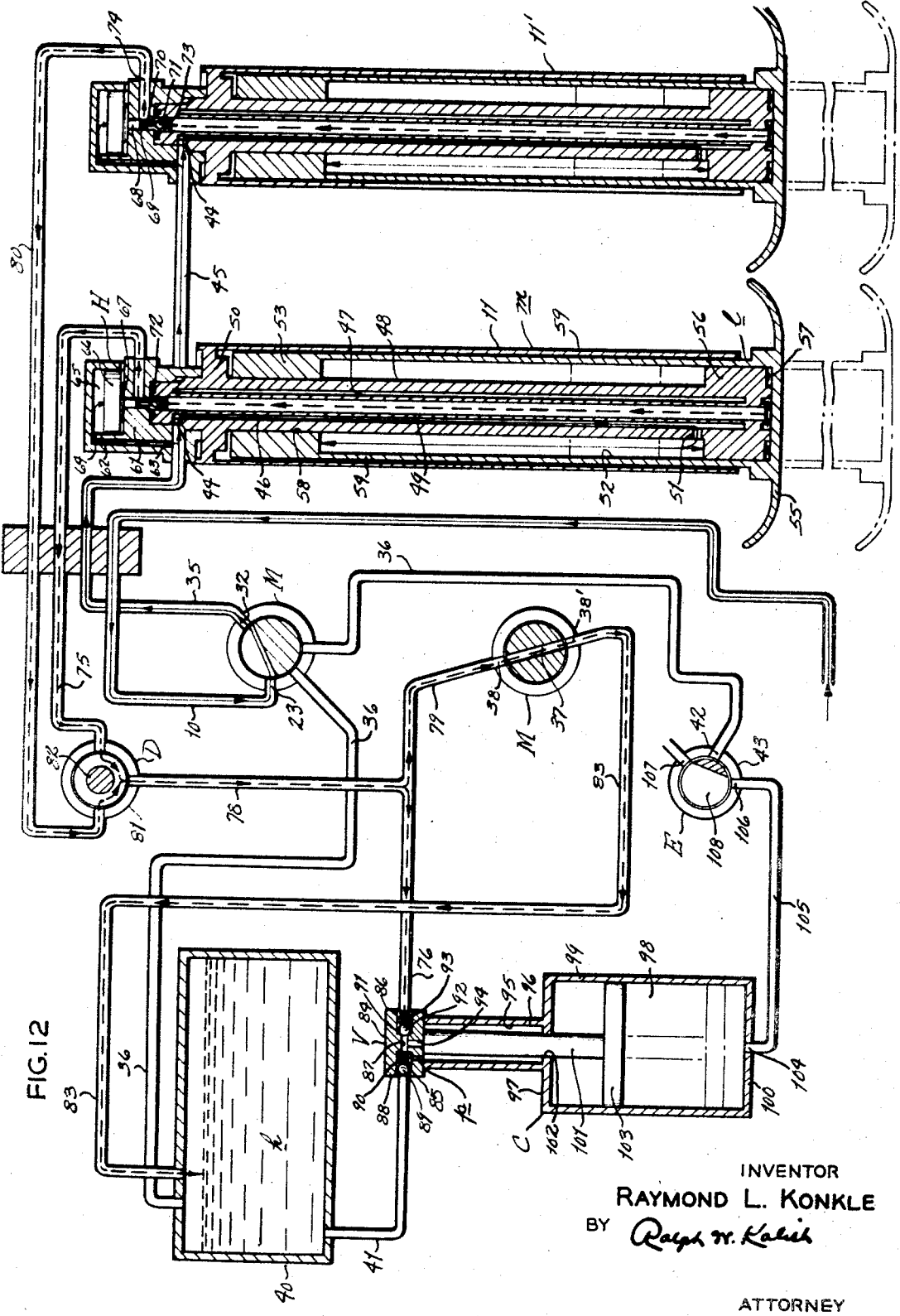

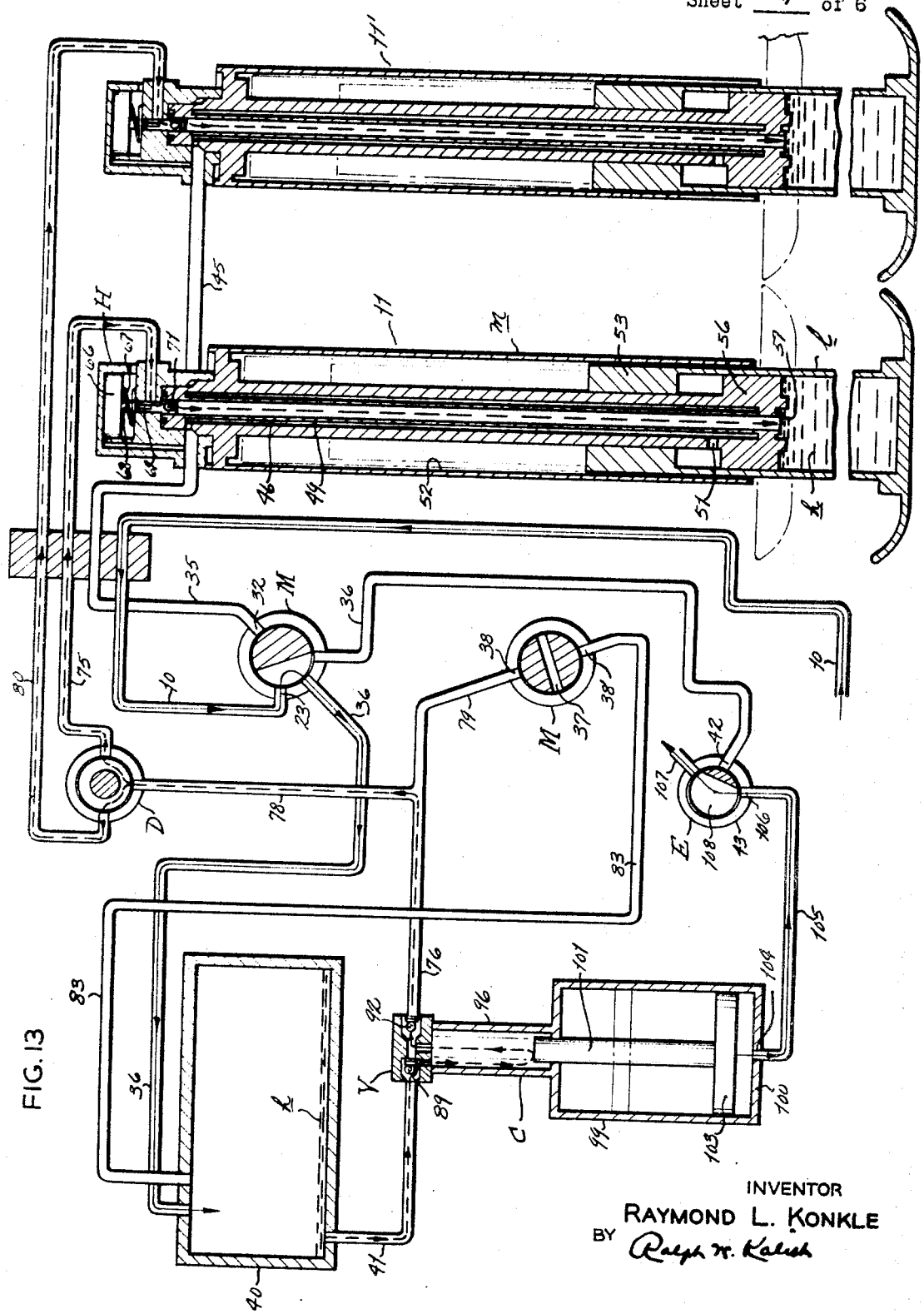

United States Patent Office 3,447,319
Patented June 3, 1969

3,447,319
HYDROPNEUMATIC SYSTEM
Raymond L. Konkle, Clinton, Iowa, assignor to Central Steel Tube Company, Clinton, Iowa, a corporation of Iowa
Filed June 10, 1966, Ser. No. 556,647
Int. Cl. F15b *15/18, 17/00, 3/00*
U.S. Cl. 60—51                                     5 Claims

ABSTRACT OF THE DISCLOSURE

A master control valve for use in a hydropneumatic system having asource of air, a source of hydraulic fluid, and a work-performing element operable responsive to a flow of air and hydraulic fluid controlled by said master control valve, there being a pressure booster provided within the system for increasing the hydraulic fluid pressure above the line pressure of the air and a release or check valve located within said work performing element for maintaining same in operable position until released by the flow of air directed by said control valve.

---

This invention relates in general to systems operated by fluids under pressure, and, more particularly, to a hydropneumatic system.

It is an object of the present invention to provide a system whereby a liquid, such as hydraulic oil, may be motivated by a pressurized gas, such as air.

It is another object of the present invention to provide a hydropneumatic system which embodies uniquely constructed, efficiently operated valves, having a minimum of positions so that the same may be easily and reliably manipulated by an operator with full assurance of appropriate functioning of the system.

It is another object of the present invention to provide a landing gear for tractor-trailer combinations operated by the hydropneumatic system of the present invention whereby the motivating gas may be obtained from the air brake system of the tractor, thus obviating resort to extrinsic gas sources.

It is a further object of the present invention to provide an extensible-retractable tractor-trailer landing gear of the type stated, wherein novel means are presented for increasing the pressure applied upon the hydraulic liquid at any desired multiple of the line pressure of the air in the tractor brake system so that requisite force is provided for independently and reliably supporting the trailer together with its load, for loading, unloading, and storage purposes.

It is another object of the present invention to provide a landing gear system for tractor-trailer combinations which includes readily accessible, manual controls for operating valves so that extension and retraction of the landing gear may be effected with minimum effort on the part of the truck operator.

It is a still further object of the present invention to provide a landing gear system of the type stated which incorporates novel valve means for conducing to the efficient and rapid operation of the system as well as for assuring of complete safety of the system in any selected condition so that accidental, unauthorized movement of the supporting legs is prevented.

It is another object of the present invention to provide a tractor-trailer landing gear system which is comprised of a minimum of parts and hence is resistant to breakdown; which system may be easily mounted upon existing trailers without requiring costly structural modification thereof; which system in operation is entirely automatic and thus obviates arduous physical effort by tractor personnel; which system may be economically produced; and which system is durable in operation.

Other objects and details of the invention will be apparent from the following description, when read in connection with the accompanying drawings, wherein:

FIGURE 1 is a perspective view of a tractor-trailer combination having mounted thereon a trailer landing gear system made in accordance with and embodying the present invention.

FIGURE 2 is a top plan view of the master control valve, illustrating same in one of its two positions.

FIGURE 3 is a vertical transverse section taken on the line 3—3 of FIGURE 2.

FIGURE 4 is a horizontal transverse section taken on the line 4—4 of FIGURE 3.

FIGURE 5 is a horizontal transverse section taken on the line 5—5 of FIGURE 3.

FIGURE 6 is a horizontal transverse section taken on the line 6—6 of FIGURE 3.

FIGURE 7 is a top plan view of the master control valve illustrating same in the other of its two positions.

FIGURE 8 is a horizontal transverse section taken substantially on the line 4—4 of FIGURE 3 illustrating the master control valve in the position shown in FIGURE 7.

FIGURE 9 is a horizontal transverse section taken substantially on the line 5—5 of FIGURE 3 illustrating the master control valve in the position shown in FIGURE 7.

FIGURE 10 is a horizontal transverse section taken substantially on the line 6—6 of FIGURE 3 illustrating the master control valve in the position shown in FIGURE 7.

FIGURE 11 is a schematic of the components of the landing gear system.

FIGURE 12 is a diagram of the system of the present invention illustrating same with the support legs in retracted position.

FIGURE 13 is a diagram of the system in the course of movement of the supporting legs into trailer-supporting or extended position.

Figure 14:
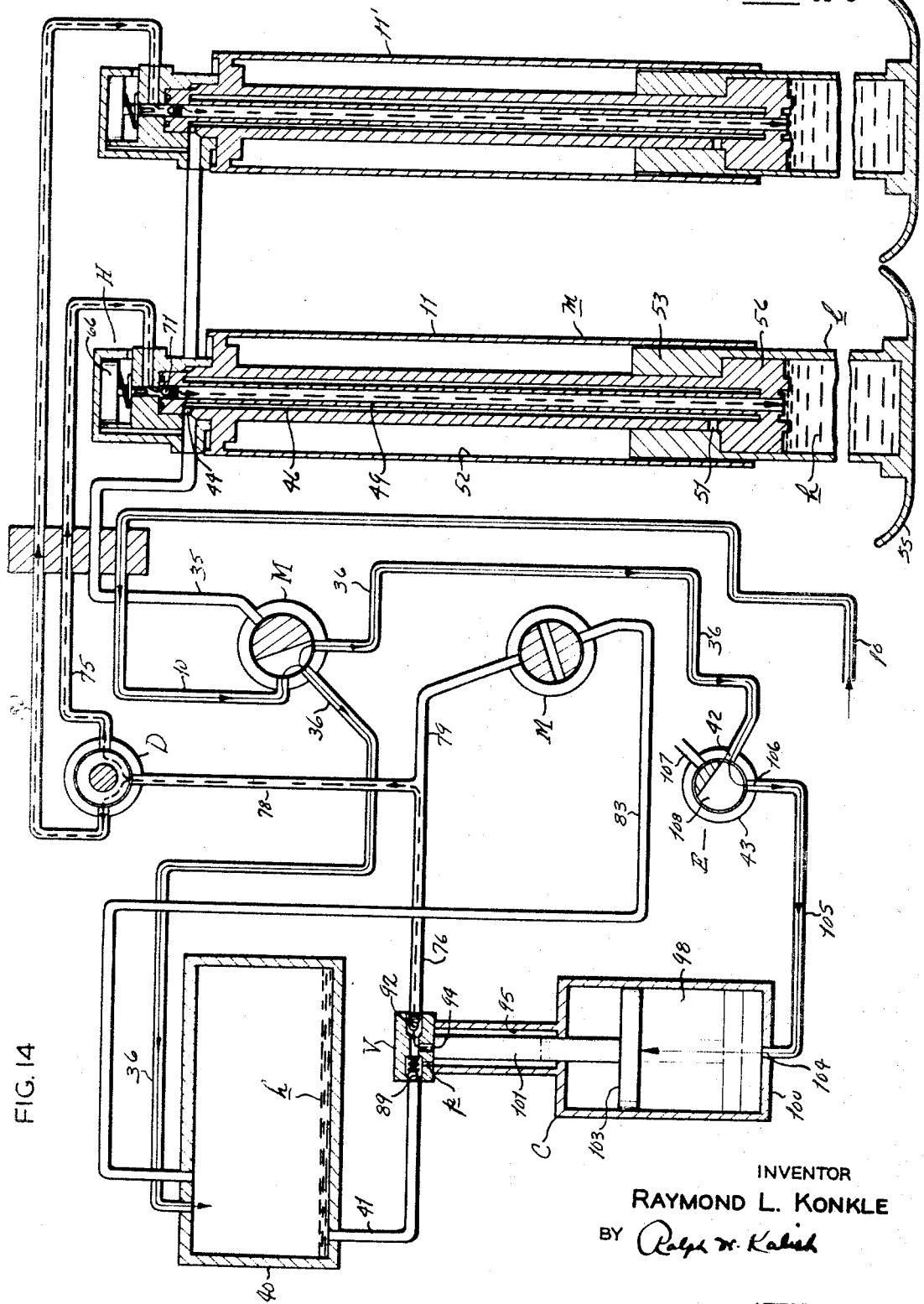
FIGURE 14 is a diagram of the system of the present invention in the first step of the pressure increasing or boosting operation, with the supporting legs in extended position.

Referring now by reference characters to the drawings which illustrate the preferred embodiment of the present invention, A generally designates a hydropneumatic system which is shown herein, for purposes of illustration only, as associated with a combination tractor-trailer for operating landing gear therefor, whereby upon disengagement of the tractor, the trailer will be fully and reliably supported, as for unloading and loading operations. A tractor of customary design is indicated 1 and is provided with a frame 2, cab 3, front and rear wheels 4, 5 respectively, and a fifth wheel 6 carrier on frame 2 for detachable securement to a load-carrying trailer 7. Said trailer 7 comprises broadly rear sets of wheels 8, 8', and a body 9 mounted upon a frame (not shown) as well as means for suitable union with fifth wheel 6. Tractor 1 and trailer 7 are equipped with the usual air brake systems (not shown) wherein the trailer air brakes are adapted for connection to that of the tractor 1, upon coupling therewith, as by suitable valve-controlled service lines, all as is well known in the art. System A of the present invention is engaged to the tractor air brake system so that air under the particular pressure of such latter system is supplied to system A as the motivating force therefor; the connecting or supply line being designated 10 in the drawings.

The landing gear of the present invention comprises basically a pair of extensible and retractable support legs 11, 11', being laterally aligned and mounted dependingly from the forward undersurface of trailer body 9, and a casing 12 for containing the leg-operating components of the system; said casing 12 being carried on said trailer body 9 preferably in immediate adjacency to legs 11, 11' and disposed for convenient manipulation of associated hand levers 13, 14, 15.

Air supply line 10 is connected by a suitable fitting to the upper portion 16 of the housing 17 of a master control valve M (see FIGURE 3), which is a combination oil and air valve. Said valve housing 17 is provided in its lower portion 18 with an axial bore 19 for receiving a valve body 20 which at one end projects beyond said housing 17 to provide an extension 21 upon which is engaged operating lever 13. Valve housing 17 is counterbored in its upper portion 17' to provide a cylindrical chamber 22, having in its wall an air inlet 23 (see FIGURE 2) which is in communication with air supply line 10. Upwardly of chamber 22 said housing 17 is further counter-bored for presenting an annular shoulder 24 for supporting and rotating thereon a valve disc 25 which, centrally on its under face, is provided with a socket 26 for receiving a tongue 27 projecting from the proximate end of valve body 20 so that upon swinging of valve body 20 responsive to manipulation of lever 13, the valve disc 25 will be rotated correspondingly. Disposed against the outer face of valve disc 25 and closing the proximate end of valve housing 17 is a cap or closure plate 28.

Said valve disc 25 is provided with an aperture 29 which on its lower end opens into chamber 22 and at its upper end is in communication with an arcuate recess 30 formed in the upper chamber-remote face of valve disc 25, which recess is somewhat less than 180°; said disc 25 also having a second recess 31 of like configuration and extent as recess 30, but being in the opposite portion of said disc 25 in symmetrical arrangement with recess 30 (see FIGURE 4). Closure plate 28, which is fixed against rotation, is provided with a plurality of air ports 32, 33, 34, which extend through closure plate 28 for pre-determined communication with valve disc recesses 30, 31, respectively, to positioning of valve disc 25. Closure plate air ports 32, 34 are connected by suitable fittings to preferably flexible air conduits 35, 36, respectively, while port 33 serves as a vent or exhaust outlet. Master control valve M is a two-position valve whereby in one position, chamber 22 will be in communication with air conduit 35 through aperture 29, recess 30 and closure plate air port 32 (see FIGURE 2) so that air from air supply line 10 will flow through the said air conduit 35 for purposes presently appearing; and whereby in the other position of said valve M, chamber 22 will be in communication with air conduit 36 through disc aperture 29, recess 30 and closure plate air port 34 (see FIGURE 7) whereby air from air supply line 10 will flow through air conduit 36 for purposes to be described. In said former position, with recess 31 aligned with closure plate air ports 33, 34 (FIGURE 2), air in air conduit 36 will be vented to the atmosphere through port 33; while in said latter, or other position, said recess 31 will be aligned with said air ports 32, 33 (FIGURE 7) so that air in air conduit 35 may be vented through air port 33.

Valve body 20 within lower portion 18 of valve housing 17 is provided with a tranverse bore 37 axially normal to said valve body 20 and being presented for registration with aligned passageways 38, 38' formed in valve housing 17; whereby in one position of valve M, more 37 will be in registration with passageways 38, 38' (FIGURE 6) for flow of hydraulic fluid therethrough, while in said other position, bore 37 will be out of registration with passageways 38, 38' for denial of or obstruction to flow of fluid therethrough. As illustrated in FIGURES 2 to 6, inclusive, when bore 37 is in registration with passageways 38, 38' for hydraulic fluid flow, valve disc 25 will be so positioned as to effect transmission of air from supply line 10 to conduit 35; while with hydraulic fluid flow inhibited by presentation of valve body 20 in its other position (see FIGURES 7 to 10, inclusive), valve disc 25 will be presented for flow of air from supply line 10 to air conduit 36.

As may best be seen in FIGURES 11 and 12, air conduit 36, which is preferably connected to master valve M through an elbow joint 39, is connected at one end to the upper portion of a reservoir tank 40 for hydraulic fluid indicated at $h$, for the purpose of directing air against the upper surface of the fluid $h$ to conduce to discharge of the latter through a liquid discharge pipe 41 progressing from the bottom of said tank 40. The other end of said air conduit 36 is engaged by a fitting to a booster control valve E for selected introduction of air thereinto through a port 42 provided in the housing 43 of said valve E for purposes to be described hereinbelow.

Air conduit 35, at its end remote from master valve M, is in communication with air ports 44 provided in the upper portions of support legs 11, 11', there being a suitable interconnecting conduit 45. As the construction and hence operation of each said support legs 11, 11' is identical, the description hereinbelow will be restricted to leg 11, but with the understanding that the same is equally applicable to support leg 11'. At its inner end port 44 is in communication with an annular air passage 46 defined by the inner surface of the bore 47 of a piston rod 48 extending longitudinally of said leg 11, and the outer surface of a tubular member 49, disposed concentrically within said bore 47 and being of substantially like extent. Piston rod 48 is integral with a closure plate 50 at its upper end. Provided in the wall of piston rod 48 proximate its lower end is an orifice 51 for effecting communication between said air chamber 46 and an annular volume indicated at 52 surrounding said piston rod 48 and being determined at its upper end by a piston head 53, a cylindrical outer wall 54, which at its lower end is closed by a ground plate or shoe 55; there being fixed at the lower end of said piston rod 48 a lower piston 56, the outer surface of which is in fluid-proof, slideable engagement with the inner face of said cylinder 54 and the upper surface of which piston 56 provides the lower limit of said volume 52. Piston 56, has formed on its under face, a plurality of openings 57 which are in communication with the lower end of tubular member 49 for purposes to be described hereinbelow. Said piston head 53 is bored as at 58, to provide a fluid-proof sliding fit with piston rod 48 so that the same, together with the cylinder 54 and related ground plate 55, which is hereinbelow referred to collectively as the lower leg designated broadly $l$, may be moved between extended (see FIGURE 14) and retracted (see FIGURE 12) position under forces to be described. Connected to, or integral with, closure plate 50, is a cylindrical wall 59, being open at its lower end and disposed surroundingly of cylindrical wall 54 of lower leg $l$ to provide a housing therefor, and to serve as a fixed upper leg designated $m$.

It will be seen that in view of the foregoing, that with air conduit 35 connected to air supply line 10 (FIGURE 12) air will be introduced into support legs 11, 11' by flow through port 44, air chamber 46, port 51 and into volume 52 for filling same to its maximum extent, so as to maintain piston head 53 upwardly and hence lower leg $l$ into retracted position within upper or fixed leg $m$.

Integrally formed with each support leg 11, 11' and mounted upwardly of closure plate 50 thereof, is a check valve indicated H, having substantially cylindrical valve housing 61 within one side of which is provided an axial passage 62, which, at its lower end, is in communication with air conduit 35 through a port 63, and which, at its upper end, opens through a radially presented port 64 into a chamber 65, within which is disposed for slideable movement therein a piston 66, which is biased by a spring 67 engaging its undersurface into upward position within said chamber 65. Depending from the under face of piston 67 and formed therewith is a piston stem 68 for projection into a bore 69 provided axially within check valve housing 61, stem 68 having a reduced portion 70 for engaging a ball valve 71 provided within the upper end of tubular member 49, which is aligned with said bore 69, but being of relatively greater internal diameter, so as to effect the development of a valve seat 72 against which said ball valve 71 is urged by a coil spring 73. Also provided within valve housing 61 is a radial passage 74 which, at its inner end opens into bore 69 at a point which is below the upper portion of piston stem 68, and which, at its outer end, is in communication with a liquid or hydraulic oil conduit 75, which latter leads to a divider valve D. With air being supplied to support legs 11, 11', as above described, incoming air will also flow through port 63, passage 62, and orifice 64 for impingement against the upper face of piston 66, so as to overcome the bias of spring 67 and force said piston 66 into and maintain same in downward position (see FIGURE 12) with the lower, reduced end 70 of piston 68 engaging ball valve 71 for overcoming the bias of the related spring 73, and thereby retain ball valve 71 away from its seat 72 in open condition, so that communication is effected between the interior of tubular member 49 and fluid conduit 75, for purposes to be more fully developed below.

With attention now being directed more fully to the hydraulic portion of system A, reservoir tank discharge pipe 41 is connected through a control valve V to divider valve D by means of a pipe 76, which, by means of an elbow fitting 77, communicates with branch pipes 78, 79; said latter being respectively engaged at their other ends to divider valve D and passageway 38 of master control valve M. The aforesaid pipe 75 connects divider valve D with support leg 11, while a similar pipe 80 connects the other side of divider valve D with support leg 11'. Said divider valve D comprises a housing 81 within which is disposed a valve body 82, movable among three operating positions by means of control lever 14. Divider valve D may be operated to permit simultaneous flow of hydraulic oil to both of said support legs 11, 11', or to either one thereof for liquid leveling purposes.

Passageway 38' of master valve M is connected by a pipe 83 to the upper side of reservoir tank 40 for return flow of hydraulic fluid h thereto. Valve V comprises a valve housing 84, having a pair of fluid chambers 85, 86 which are axially aligned and interconnected at their inner ends by a passage 87; said fluid chamber 85 being suitably connected to, and in communication with, reservoir discharge pipe 41, and said fluid chamber 86 being connected to pipe 76. The end of fluid chamber 85 adjacent the connection to pipe 41 is formed to provide a valve seat 88 for a ball valve 89, which is urged against said seat 88 by a spring 90. The inner end of fluid chamber 86, or the end remote from the connection to pipe 76, is formed to provide a valve seat 91, against which a ball valve 92 is biased by a spring 93. Said valve housing 83 is further provide with a passage 94 opening at one end into passage 87, and at its other end communicates with the upper end of an upper cylindrical chamber 95 of a booster cylinder C; there being also a passage p extending between fluid chamber 85 and cylinder chamber 95, for establishing fluid flow as indicated by arrows in FIGURE 13. Chamber 95 of cylinder C is defined by an annular wall 96 which, at its upper end is fixed to the confronting portion of valve housing 84 for integration therewith. At its lower end, wall 96 is integral with the upper end plate 97 of a lower relatively enlarged chamber 98, having cylindrical side wall 99, and a bottom end wall 100. Presented for axial, slideable movement within cylinder C, is a piston 101 which projects in its upper portion through an opening 102 in end plate 97 for extension of said piston into upper chamber 95, there being conventional sealing means for maintaining the joint between opening 102 and piston 101, fluid-proof. Hydraulic fluid h, entering upper chamber 95 through passage 94, will act upon the upper end of piston 101, for urging same into downward position (see FIGURE 13). Said piston 101 is thus of greater length than chamber 98, and at its lower end, mounts a head or disc 103, having a diameter substantially equal to the inside diameter of chamber 98 for slideable moveemnt therein; there being packing rings or like sealing members (not shown) appropriately mounted upon piston head 103, to assure proper liquid-tight engagement with the inner face of wall 99 of said chamber 98.

Provided in bottom end wall 100 is an air port 104 which is suitably connected to one end of an air conduit 105, the other end of which is secured within a port 106 in housing 43 of valve E. Said valve housing 43 also includes an exhaust port 107 for venting air therein to the atmosphere. Valve E comprises a valve body 108 provided within valve housing 43 for selected positionment therein by operation of hand lever 15, whereby valve body 108 may be disposed in either of valve E's two operating conditions; one being wherein port 42 is in communication with port 106 (FIGURE 14) for connecting chamber 98 of valve body C with air supply line 10; the other being wherein port 106 is connected to exhaust port 107 (with inlet port 42 being closed) (see FIGURES 12, 13, 15) for discharge of air from chamber 98 of cylinder C.

The differential in radius between piston 101 and head 103 operating within their respective compartments 95, 98, is of criticality in the effective operation of the present invention. Such differential allows for a stepping-up or "boosting" of the air pressure operating against hydraulic fluid h to a value above that of the line pressure in the air brake system of the tractor. Thus, for instance, if the radius of piston 101 is one inch and that of head 103 is five inches, an increase in pressure in a ratio of 25 to 1 will be effected, since the resulting pressure will vary directly as the square of the radii of said piston 101 and head 103. If the air pressure operating against head 103 is 100 lbs./sq. inch, being the line pressure, then piston 101 with a one inch radius, will exert a pressure of 2,500 lbs. against fluid h in chamber 95. It is apparent that any selected ratio of radii may be utilized depending upon the resultant pressure desired. As the description of the workings of the present invention set forth below will reveal, the increasing of the pressure applied upon the hydraulic fluid h by the novel construction and function of cylinder C assures of the consistent reliability of operation of the present invention and of the ready adaptation of the same for use with existing air systems regardless of the particular line pressures therein.

The operation of the present invention is as follows:

With trailer 7 being towed by tractor 1, landing gear support legs 11, 11' will, understandably, be in upward or retracted position, as shown in FIGURE 1, and with the components of the system being in the position indicated in FIGURE 12 to which reference will now be made. Master control valve M will be in the operative position illustrated in FIGURE 12 and FIGURES 2 to 6 inclusive, whereby hydraulic fluid h may flow therethrough returningly to liquid reservoir 40; said divider valve D being open to both support legs 11, 11', so that any hydraulic fluid h therein may be thus returned.

It will be seen that hydraulic fluid within pipe 76 will force valve 92 into closed condition. With master control valve M in such condition, air supply line 10 will be connected therethrough to air conduit 35 for direction to legs 11, 11' as above discussed; said air conduit 36 being closed so that no line pressure of the air brake system is directed onto the upper surface of the liquid h in reservoir tank 40, so that flow thereof through valve V is inhibited by ball valve 89. It will be seen that with the system in the condition shown in FIGURE 12, the hydraulic oil portion thereof is so set as to direct such liquid to tank 40. As shown in FIGURE 12, the components of the air side of system A are so arranged as to force air into volume 52 of legs 11, 11' for urging lower leg *l* into upper, contracted condition, with the line pressure of the air acting against the under face of piston heads 53. As shown above, ball valve 71 will be urged into open condition by stem 68 of piston 66. With the landing gear retracted, exhaust valve E and master control valve M are set to prevent loss of air from the system via ports 107 and 33, respectively, in order to assure the reliable holding of lower legs *l* and support legs 11, 11' against inadvertent premature, accidental descent.

When it is desired to disconnect trailer 7 after it has reached its destination, as for loading or unloading, necessitating such an amount of time as to make it undesirable to retain tractor 1 in coupled relationship therewith, master control valve M is turned by manipulation of hand lever 13 into its second position for disposition into the condition shown in FIGURE 13 (as well as in FIGURES 7 to 10 inclusive) to effect flow of air and hydraulic fluid *h* for forcing lower legs *l* of landing gear support legs 11, 11' into extended or trailer-supporting position.

Referring now to FIGURE 13, such operation of master control valve M causes air supply line 10 to be brought into communication with air conduit 36 (the latter being shown in two parts in said FIGURES 12 to 15 inclusive, for purposes of illustration only), so that air is directed into tank 40 for providing a flow-motivating force for the hydraulic fluid *h* therein so as to force same outwardly through discharge pipe 41 into valve body V with unseating of ball valve 89, 92 for flow to fluid *h* through pipes 76, 78, and thence to pipes 75, 80 by way of divider valve D, the valve body 82 of which is so set as to permit simultaneous flow through the last two-named conduits for delivery of fluid *h* to legs 11, 11'. It will be seen that master valve M is so positioned that bore 37 is in non-registering relationship to housing passages 38, 38' so as to prevent unauthorized return flow of liquid to tank 40.

In its said condition, master valve M will cause air conduit 35 to be connected to exhaust port 33, so that air received in said air conduit 35 from support legs 11, 11' will be vented to the atmosphere, thereby releasing the air pressure within support legs 11, 11' with reduction of the force acting on piston 66 in valves H, so as to allow same to be restored to upward condition under bias of the associated springs 67, whereby ball valves 71 may be returned to seated condition under influence of the respective springs 73.

It will be seen that valve body 108 of valve E is so turned as to occlude port 42, whereby the pressure of the air within air conduit 36 will not be inadvertently reduced.

Hydraulic fluid *h* will enter radial passage 74 of valve housing 61 for flow into bore 69, with the pressure of such liquid forcing ball valve 71 into open condition, whereby said liquid *h* will descend tubular member 49, for emission through the openings 57 in the lower end of piston 56 for forceful flow against the confronting inner face of the related ground shoe 55 to cause the respective lower leg *l* to be shifted downward into extended position. By such downward travel of lower legs *l*, air within volumes 52 is thereby displaced and hence caused to move through orifices 51, thence upwardly within air chamber 44 for egress through port 45 and thence to the atmosphere via conduit 35 and ports 32, 33. Lower legs *l* of support legs 11, 11' will continue their descent into extended position until ground plates 55 are brought into contact with the support surface such as the ground, in which condition the under face of piston heads 53 may be in spaced relationship with the upper face of the related pistons 56 as shown in FIGURE 13.

Hydraulic fluid *h* in extended lower legs *l* is, at this point, under no greater pressure than that acting thereon by the air in the brake system, and such acting pressure may well be below line pressure, and thus, although sufficient to extend said lower legs *l*, may not be adequate to withstand the load of the trailer and its cargo, or to elevate the front end of said trailer to a height requisite for disengagement of fifth wheel 6. In order to insure the stabilization of legs 11, 11', to support the applied load, as well as to raise the proximate end of trailer 7 for uncoupling, a pressure-increasing operation is carried out by appropriate functioning of exhaust valve E through the manipulation of its control lever 15.

Referring now to FIGURES 12 and 13, it will be seen that with lower legs *l* retracted, or during the descending operation thereof, valve E is in closed condition, so that air is not introduced into cylinder C. In this state, piston 101, together with piston head 103, will be in downward disposition within chamber 98 under force of hydraulic fluid *h* entering upper chamber 95 from valve V so that substantially all of the air within cylinder C is exhausted therefrom by such action of piston 101 for escape to the atmosphere through port 107 of valve E. With support legs 11, 11' extended as shown in FIGURE 13, and with master valve M maintained in the condition shown in FIGURE 13 wherein hydraulic fluid flow therethrough is inhibited and air conduit 35 is connected to the atmosphere, hand lever 15 of valve E is swung so as to move valve body 108 to occlude exhaust port 107 and connect air conduit 105 with air supply line 10 via air conduit 36 and master control valve M, so that air under line pressure is delivered to the lower portion of chamber 98 of cylinder C via port 104 for direct operation against the under face of piston head 103 to cause same, together with piston 101, to move upwardly against the hydraulic fluid *h* within chamber 95, but at a considerably greater pressure than that in the tractor air brake system because of the pre-selected differential in cross sectional area between piston head 103 and piston 101.

The force translated to hydraulic fluid *h* within chamber 95 is many times that of the line pressure, such as in the order of 2500 percent if the radii of said piston head 103 and said piston 101 are five inches and one inch, respectively. Accordingly, hydraulic fluid *h* is driven through passages *p* and 94 and into valve V for unseating of ball check valve 92, forcing fluid *h* into conduit 76 and thence into lower legs *l* of said support legs 11, 11' via conduit 78, divider valve D, conduit 75, 80 and the respective tubular members 49 of said support legs 11, 11', thereby enhancing the pressure of the fluid *h* in said lower legs *l* for increasing the pressure within said lower legs *l*.

It will be observed that ball check valve 89 of valve V will be maintained in closed condition by the pressurized hydraulic fluid *h*, so as to deny any undesired return flow through tank discharge pipe 41. With master control valve M set as described, the hydraulic fluid *h* within upper chamber 95 of cylinder C is forced to flow into said lower legs *l*, and any backward pressure is resisted by ball valve 92.

This boosting operation is to be repeated for further enhancement of pressure within the extended support legs 11, 11'.

Figure 15:
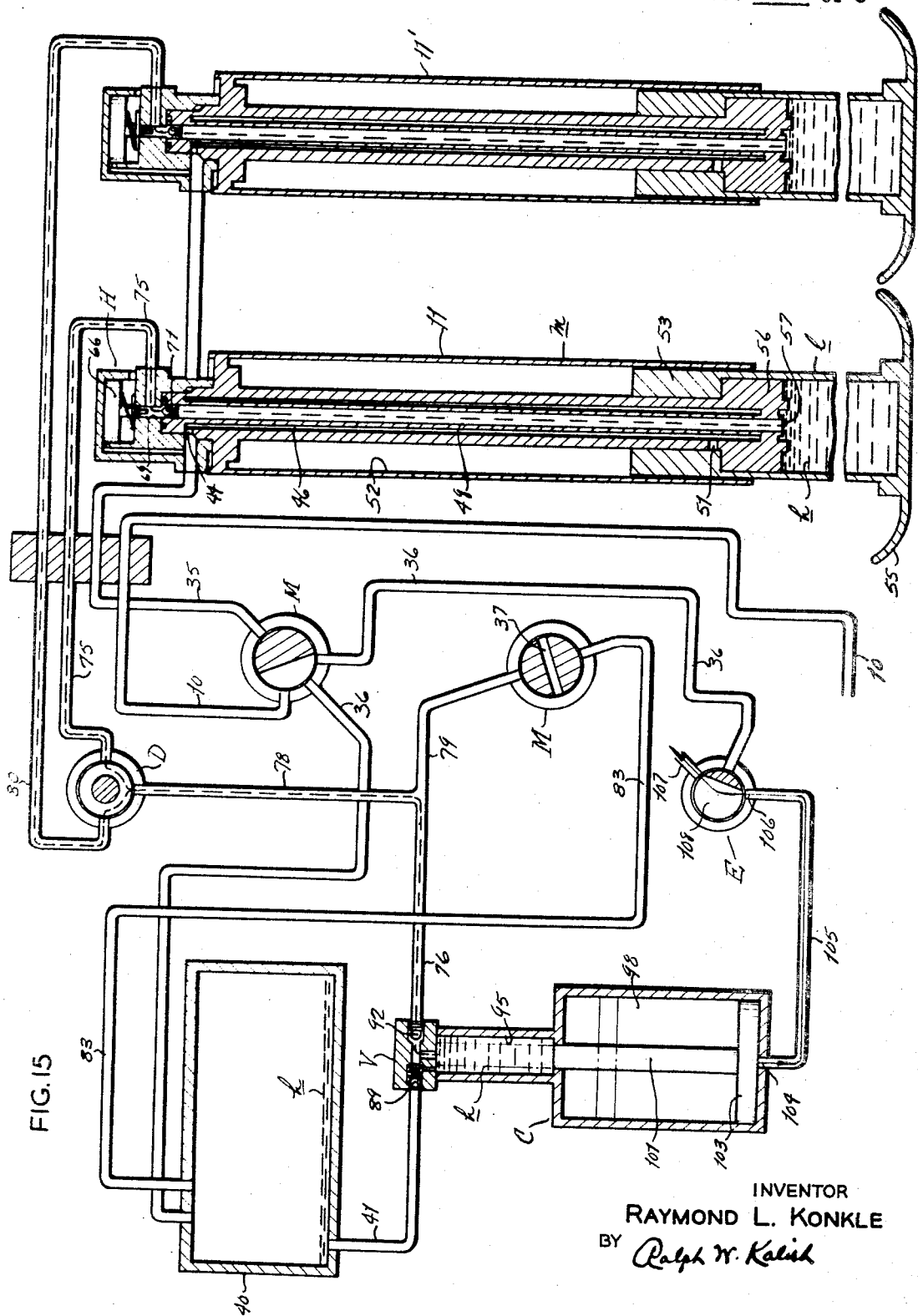
FIGURE 15 is a diagram of the system of the present invention in the second step of the pressure increasing or boosting operation.

In order to accomplish same, valve E lever 15 is turned so as to place valve body 108 in the condition shown in FIGURE 15, so that air may be exhausted to the atmosphere through exhaust port 107 from changer 98 of cylinder C, thereby removing the force acting against the under face of piston head 103 so that the pressure heretofore acting against hydraulic fluid *h* within chamber 95 is removed, resulting in downward shifting of piston 101 together with piston head 103 under force of the said hydraulic fluid *h* in chamber 95, since such is relatively greater than that of the air within chamber 98. Since the hydraulic fluid *h* within tank 40 is under the line air pressure such will cause an unseating of ball valve 89 for introduction of further hydraulic fluid *h* into upper chamber 95; ball valve 92 remaining closed under the pressure of hydraulic fluid *h* within pipe 76, so that there is no motion of developed pressure within support legs 11, 11'. With hydraulic fluid *h* substantially filling upper chamber 95, the operator then manipulates valve E to the position shown in FIGURE 14 for closing exhaust port 107 and connecting lower chamber 98 of cylinder C with air supply line 10 for repeating the operation of forcing hydraulic fluid *h* into support legs 11, 11' under the increased pressure effected by the functioning of cylinder C. Any residual air that may have been within volumes 52 is fully evacuated therefrom, whereby support legs 11, 11' are in firm reliable condition for supporting the superimposed load of trailer 7, as well as permitting the elevation of the front end thereof for facilitating disengagement of fifth wheel 6. Thus, as may best be seen in FIGURES 14 and 15, the boosting operation will intimately maintain the under face of piston heads 53 abuttingly against the upper face of the related pistons 56. The air brake system of tractor 1 may then be disunited from the dependent trailer brake system and the tractor may then be pulled away.

Trailer 7 is thus in independently supported condition for loading or unloading operation, and may remain in such parked condition for an indefinite period of time without danger of inadvertent or accidental pressure loss in the landing gear support legs 11, 11', with attendant damaging collapse. Hydraulic fluid *h* is trapped against escaping flow by the setting of the valve system and removal of tractor 1 denies any possibility of the supply of pressurized air to the system while the legs are so extended. However, even if tractor 1 were engaged relationship to trailer 7, the valve system would efficiently close supply line 10, against the unauthorized ingress of air thereinto.

In order to return support legs 11, 11' to retracted position for road travel of trailer 7, the operator of tractor 1 will present same into poistion with respect to the parked trailer 7 and cause fifth wheel 6 to be interengaged as well as effect hook-up of the air brake system of the tractor to that of the trailer 7. Master control valve M is swung to the position shown in FIGURE 12 (and FIGURES 2 to 6, inclusive), in order that air is directed from supply line 10 into conduit 35 for delivery of air to ports 44 of support legs 11, 11', whereby air will be reintroduced into chamber 65 of valve H for driving piston downwardly with resultant unseating of ball valve 71 as above described to open a return flow path for fluid *h* within the related lower legs *l* via openings 57, tubular member 49, bore 69, radial passage 74, and conduits 75, 80, respectively, from whence fluid will proceed along conduits 78, 79 through bore 37 of master control valve M for re-delivery to tank 40 by way of conduit 83. By the release of the fluid pressure *h* within the lower legs *l* with consequent limited upward urging of said lower legs *l* as into the position shown in FIGURE 13, air admitted to said support legs 11, 11' through port 44 will travel downwardly through air chamber 46 and into volumes 52 by way of orifices 51 for acting against the under face of piston heads 53 so as to drive lower legs *l* upwardly into fully retracted position, as shown in FIGURE 12, with the said hydraulic fluid *h* being thereby assisted in its return flow.

The foregoing demonstrates the complete cycle of operation of the hydropneumatic system of the present invention. It is, of course, obvious that divider valve D may be appropriately operated for selected flow of fluid *h* to either support leg 11, 11' in order to equalize any inadvertent differential in load on the trailer 2, that may have developed thereon.

The present invention as applied to loading gears for tractor-trailer combinations may be utilized with existing trailer constructions without requiring any extensive alteration or modification of the trailer structure, and, more particularly, the present invention is fully operable regardless of the particular line pressure of the air in the tractor air brake system because of the booster cylinder C.

Although, as stated, the present invention has been described particularly with respect to landing gears for trailers, the extreme versatility of same is self evident, for it is equally adaptable to effecting operation of myriad types of work devices wherein a source of air under pressure constitutes the prime motivating force.

It should be understood that changes and modifications in the formation, construction, arrangement, and combination of the several parts of the hydropneumatic system may be made and substituted for these herein shown and described without departing from the nature and principle of my invention.

Having thus described my invention, what I claim and desire to secure by Letters Patent is:

1. A hydropneumatic system comprising a source of air under predetermined line pressure, a source of hydraulic fluid having an inlet and an outlet, first conduit means connecting said source of air with said source of hydraulic fluid for motivating flow of said fluid therefrom under air pressure, a work-performing member having a slidable element adapted to be actuated in one direction of movement by said hydraulic fluid and in the other direction of movement by said air, second conduit means operatively connecting said source of hydraulic fluid with said slideable element for movement of same into one position, third conduit means connecting said slideable element with said source of air for movement of the same into its other position, a release valve having first and second compartments, said first compartment being in communication with said second conduit means, said second compartment being in communication with said third conduit means, a valve member provided slideably within said first compartment of said release valve and being urged into closed condition by hydraulic fluid within said work performing member to prevent unauthorized, premature flow of said fluid from said member through said second conduit means for return to said source of hydraulic fluid, air actuated means provided in said second compartment, said valve member being adapted for movement into valve-open condition by said air-actuated means for permitting return fluid flow, a unitary control valve having first and second valve portions, said first valve portion being located within the path of said first and third conduit means, said second valve portion being located between said second conduit means and said source of hydraulic fluid, fourth conduit means for connecting said second conduit means with the inlet of said source of hydraulic fluid, said control valve having first and second operative positions, means for operating said control valve selectedly into said first and second positions whereby in said first position said control valve:

(a) closes said first conduit means for denying motivated air pressure to said source of hydraulic fluid,
(b) opens said third conduit means for flow of air to said slideable element for effecting movement thereof, and
(c) open said fourth conduit means for return flow of hydraulic fluid to its source, and whereby in said second position said control valve:

(d) opens said first conduit means to cause flow of hydraulic fluid,
(e) closes said third conduit means for inhibiting air flow to said work-performing member, and
(f) closes said fourth conduit means for preventing return hydraulic fluid flow to its source.

2. A hydropneumatic system as defined in claim 1 and further characterized by a pressure boosting device for increasing the pressure hydraulic fluid acting on the pressure head above the line pressure of the air, said device having first and second compartments, a hydraulic fluid non-return valve mounted on said pressure boosting device, said valve having a valve housing with passageways therein connecting said valve housing with the first compartment of said pressure boosting device, a valve member disposed in said valve housing, said non-return valve being connected to said source of hydraulic fluid, and means for maintaining said valve member against flow of fluid from said first compartment of said pressure boosting device, returningly to said source of hydraulic fluid.

3. A hydropneumatic system as defined in claim 2, and further characterized by the cross section of the second compartment of said pressure boosting device being of a predetermined extent greater than the cross section of said first compartment, said first and second compartments being co-axial, fifth conduit means connecting said second compartment with said source of air, a piston member disposed slideably in said device and having an enlarged head portion located within said second compartment for application against the end face thereof of air pressure and a relatively narrow stem portion disposed within said first compartment for subjection in its end portions to fluid entering said first compartment through said non-return valve, said stem being of such length relative to said first compartment as to act as a seal to prevent unauthorized flow of said hydraulic fluid into said second compartment and an air flow control member interposed in said fifth conduit means for selectedly permitting connection between said second compartment and said source of air and between said second compartment and the atmosphere.

4. A hydropneumatic system comprising a source of air under predetermined line pressure, a source of hydraulic fluid having an inlet and an outlet, a work-performing member, having reciprocally slideable element, means for sequentially directing hydraulic fluid and air to said work-performing member for selected movement of said slideable element, a control valve located between said sources of air and hydraulic fluid and said work-performing member, said valve having first pneumatic portion and a second hydraulic portion, first conduit means connecting said source of air and said control valve, second conduit means connecting said pneumatic portion of said control valve to said work-performing member for effecting operation of the slideable element under air pressure in one direction of its movement, third conduit means connecting the pneumatic portion of the said control valve to said inlet for said source of hydraulic fluid for directing air thereto for motivating flow of fluid through said outlet flow-path, establishing means connecting said fluid outlet with said work-performing member for effecting movement of said slideable element in its other direction of travel, fourth conduit means connecting the hydraulic portion of said inlet for returning hydraulic fluid to its source, said control valve having first and second operative positions, means for shifting said control valve into either of said first or second positions whereby in said first position said control valve:

(a) opens said first and second conduit means for flow of air to said work-performing member,
(b) closes said third conduit means for inhibiting flow of hydraulic fluid, and
(c) opens said fourth conduit means for return flow of fluid to its source, and whereby in its second position; said control valve:

(d) opens said first and third conduit means for directing air to said source of hydraulic fluid for flow thereof,
(e) closes said second conduit means to deny air to said work-performing member, and
(f) closes said fourth conduit means for preventing undesired return flow of hydraulic fluid to its source.

5. A hydropneumatic system comprising a source of air under predetermined line pressure, a source of hydraulic fluid having an inlet and an outlet, a work-performing member having a reciprocally slideable element, a master control valve for sequentially directing hydraulic fluid and air to said work-performing member for selected movement of said slideable element, said master control valve having means defining a housing with first and second chambers, said housing having a transverse port for connecting said first chamber with the exterior; first conduit means connecting said port with said source of air; said housing further having a pair of axially normal, diametrically opposed passageways connecting said said second chamber with the exterior, second conduit means connecting one of said passageways with said work-performing element, third conduit means connecting the other of said passageways to the inlet of said source of fluid, a valve body provided within said second chamber, said valve body having a transverse bore extending therethrough and being rotatable within said second chamber so that said transverse bore may be presented for registration with said passageways, a valve disc provided in said first chamber, said valve disc having an aperure extending therethrough and a pair of diametrically opposed arcuate recesses provided in the chamber-remote face of said valve disc, a closure plate mounted on said housing in immediate adjacency to the chamber-remote face of said valve disc, said closure plate having a plurality of openings extending therethrough for communication with said recesses, fourth conduit means connecting one of said openings to said work-performing element, fifth conduit means connecting another of said openings to the inlet of said source of fluid, sixth conduit means connecting the outlet of said source of fluid to said work-performing element, means connecting said valve body and said valve disc for effecting coincident rotative movement of same into first and second positions, whereby in said position; said control valve:

(a) opens said first and fifth conduit means for directing air to said source of hydraulic fluid for effecting flow thereof through said sixth conduit means,
(b) closes said fourth conduit means to deny air to said work-performing member, and
(c) closes said second and third conduit means for preventing undesired return flow of hydraulic fluid to its source, and whereby in its second position; said control valve:

(d) opens said first and fourth conduit means for flow of air to said work-performing member,
(e) closes said fifth conduit means for inhibiting flow of air to said source of hydraulic fluid for effecting termination of flow of hydraulic fluid through said six conduit means,
(f) opens said second and third conduit means for return flow of hydraulic fluid to its source.

References Cited

UNITED STATES PATENTS

| | | | |
|---|---|---|---|
| 2,490,823 | 12/1949 | Manning | 91—4 |
| 3,029,061 | 4/1962 | Hoxworth | 251—63.4 |
| 3,114,387 | 12/1963 | Barkman | 251—63.4 |
| 3,177,664 | 4/1965 | Konkle | 91—4 |
| 3,286,311 | 11/1966 | Rhoads | 91—4 |

PAUL E. MASLOUSKY, *Primary Examiner.*

U.S. Cl. X.R.

91—4, 216, 411